US007993424B2

(12) United States Patent
Takeuchi et al.

(10) Patent No.: US 7,993,424 B2
(45) Date of Patent: Aug. 9, 2011

(54) AIR CLEANER

(75) Inventors: Yasuharu Takeuchi, Tokyo (JP); Minoru Toyoda, Tokyo (JP); Koutarou Okayasu, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 446 days.

(21) Appl. No.: 12/126,016

(22) Filed: May 23, 2008

(65) Prior Publication Data

US 2009/0126678 A1 May 21, 2009

(30) Foreign Application Priority Data

May 24, 2007 (JP) ................................ 2007-138099

(51) Int. Cl.
*B01D 46/00* (2006.01)

(52) U.S. Cl. ............. 55/385.3; 55/410; 55/418; 55/498; 55/503; 55/504; 123/198 E

(58) Field of Classification Search ................. 55/385.3, 55/318, 497, 498, 502, 319, 337, DIG. 28, 55/410, 418, 503, 504; 123/198 E; 264/DIG. 68
See application file for complete search history.

(56) References Cited

U.S. PATENT DOCUMENTS

| | | | | |
|---|---|---|---|---|
| 5,089,938 | A * | 2/1992 | White et al. | 361/825 |
| 5,865,863 | A * | 2/1999 | DeSousa et al. | 55/385.3 |
| 6,355,077 | B1 * | 3/2002 | Chittenden et al. | 55/385.3 |
| 6,395,049 | B2 * | 5/2002 | Knodler et al. | 55/385.3 |
| 6,840,973 | B2 * | 1/2005 | Kuji et al. | 55/385.3 |
| 2003/0051453 | A1 * | 3/2003 | Moreau et al. | 55/385.3 |
| 2005/0247034 | A1 * | 11/2005 | Canova et al. | 55/385.3 |
| 2006/0288672 | A1 * | 12/2006 | Miyake et al. | 55/385.3 |
| 2007/0220848 | A1 * | 9/2007 | Diepolder et al. | 55/385.3 |
| 2008/0053394 | A1 * | 3/2008 | Tsutsui et al. | 123/184.21 |
| 2008/0083200 | A1 * | 4/2008 | Gruber et al. | 55/385.3 |
| 2009/0183709 | A1 * | 7/2009 | Kubo et al. | 123/198 E |

FOREIGN PATENT DOCUMENTS

| | | |
|---|---|---|
| CA | 2 609 759 | 12/2006 |
| JP | 2007-002783 | 1/2007 |

* cited by examiner

*Primary Examiner* — Duane Smith
*Assistant Examiner* — Minh-Chau Pham
(74) *Attorney, Agent, or Firm* — Smith, Gambrell & Russell, LLP

(57) ABSTRACT

An air cleaner case of an air cleaner used in an engine provides a lower casing holding a cleaner element thereon, and a cover accommodating the cleaner element therein. The lower casing includes a base on which the cleaner element is mounted, an exhaust duct extending downward from the base so that air purified by the cleaner element is conveyed to the intake side of the engine, an inlet duct extending downward from the base along the exhaust duct, and an inlet cylinder extending upward into the accommodating chamber from the base so as to be continuous with the inlet duct.

20 Claims, 10 Drawing Sheets

AIR CLEANER

CROSS-REFERENCE TO RELATED APPLICATION

The disclosure of Japanese Patent Application No. 2007-138099 filed on May 24, 2007 including the specification, drawings and abstract is incorporated herein by reference in its entirety.

BACKGROUND OF THE INVENTION

1. Field of the Invention

The present invention relates to air cleaners and, more particularly, to air cleaners used in general-purpose engines.

2. Description of the Related Art

Typically, an inclined type general-purpose engine includes: an engine body having an inclined cylinder section and a crank case; a fuel tank installed on the crank case; a carburetor disposed at one side of the cylinder; an air cleaner connected to the carburetor; and an exhaust muffler disposed on the other side of the cylinder section. The air cleaner and exhaust muffler are disposed laterally to the fuel tank and above the cylinder section.

The air cleaner takes in and purifies outside air and then supplies the purified air to a carburetor disposed below the air cleaner. Generally, this air cleaner includes: an upper casing accommodating a cleaner element used to purify the outside air introduced, and a lower casing holding the cleaner element. The lower casing has: a base holding the cleaner element placed thereon; and an exhaust duct extending downward from the base and used to guide the air purified by the cleaner element to the carburetor.

Formed in the base is an intake port for taking outside air into the upper casing. Connected to this intake port is an inlet cylinder extending upward within the upper casing. Outside air is introduced into the upper casing through an inlet passage defined by the inlet cylinder from the intake port. The introduced outside air is purified by the cleaner element disposed in the upper casing. The purified air is introduced into an exhaust duct through a communicating opening made in the base, and is then supplied to the carburetor through the exhaust port of the exhaust duct.

An air cleaner having such a configuration is disclosed in, for example, Japanese Patent Application Laid-Open No. 2007-2738.

The structure of the air cleaner case causes the air cleaner to generate the noise of air currents flowing in the air cleaner. Such air current noise or vibrating noise or the like generated from an engine may lead to noise pollution, which is disadvantageous. One of the major structural factors relates to the length of the inlet passage. In other words, a long straight inlet passage can reduce air current noise. However, it is difficult to achieve it because any increase in the length of the inlet cylinder within the upper casing is limited by the size of the upper casing. In addition, enlarging the upper cover, that is, increasing the height of the upper casing, increases the overall size of the engine, which is unfavorable. It is also difficult to lengthen the inlet cylinder downward because the carburetor, etc., may block it.

Since the inlet opening is situated above the cylinder section, outside air heated by the cylinder section is drawn in. Such heated air affects fuel carburetion within the carburetor. Accordingly, it is preferable to avoid drawing in such heated air.

SUMMARY OF THE INVENTION

The present invention has been proposed in view of the drawbacks discussed above. It is therefore an object of the present invention to provide an air cleaner configured so that air current noise as described above is reduced and heated air is not drawn in.

In the invention according to a first aspect, in order to achieve the foregoing object, there is provided an air cleaner comprising an air cleaner case disposed near a cylinder of an engine, and a cleaner element accommodated in the air cleaner case and being used for sectioning the inside of the air cleaner into a dirty side and a clean side so that outside air that has flowed into the dirty side is purified by the cleaner element and the purified air is caused to flow into the clean side, the air cleaner case including a lower casing holding a cleaner element thereon and an upper casing mounted on the lower casing and accommodating the cleaner element therein, the lower casing includes a base on which the cleaner element is mounted, an exhaust duct extending downward from the base such that one end thereof communicates with the clean side and the other end thereof communicates with the intake side of the engine, an inlet duct extending downward from the base along the exhaust duct such that the lower end thereof communicates with the outside, and an inlet cylinder extending upward from the base such that the upper end thereof communicates with the dirty side and the lower end thereof communicates with the upper end of the inlet duct.

According to the invention of the first aspect, providing the inlet duct extending along the exhaust duct from the base makes it possible to lengthen a passage along which outside air is drawn into the dirty side of the cleaner element, thereby reducing air current noise.

The inlet duct is disposed along the inlet passage. This makes it possible that the outer shape of the air cleaner case may be almost identical to that of a conventional air cleaner case. Accordingly, an existing air cleaner in the same type of engine can easily be replaced with an air cleaner that has the air cleaner case of the present invention formed to reduce air current noise.

In the invention according a second aspect, the inlet duct is deposed on the opposite side to an intake side of the engine and extends at least almost the same length as the exhaust duct, and an inlet passage formed from the inlet duct and inlet cylinder is almost straight.

Accordingly, the invention of the second aspect further reduces air current noise generated from the inlet passage.

In addition, the lower end of the inlet duct is located apart from the cylinder section in a lateral direction. Therefore, the inlet duct is effectively prevented from drawing in outside air heated by the cylinder section. This prevents fuel carburetion in the carburetor from being affected by heated air.

In the invention according to a third aspect, in the air cleaner of the first aspect, the base, the exhaust duct, and the inlet duct are integrally formed from a resin.

According to the invention of the third aspect, the air cleaner case having the air current noise reduction effect can easily be manufactured by molding a resin. In addition, integral molding increases the rigidity of the air cleaner case. This reduces resonance with engine vibration, thereby achieving the effect in reducing noise.

In the invention according to a fourth aspect, the air cleaner case of the first aspect is such that the base is in the form of a board and has an annular projection vertically formed on the periphery of the base, and the upper casing is in the form of a box open at one end and has an annular connection part formed on the periphery of the open end so as to engage with the annular projection; this annular connection part has a contact face with which the leading edge of the annular projection comes into contact when the annular connection part fits on the annular projection.

According to the invention of the fourth aspect, the upper casing is connected to the base of the lower casing such that the leading edge of the annular projection of the base and the contact face of the annular connection part of the upper cover engage with each other, thereby forming a tight seal around the joint between the base and upper casing. This prevents outside air from being drawn in through the joint, and prevents emission of air current noise.

In the invention according to a fifth aspect, the air cleaner case of the fourth aspect includes a sealing member inserted between the leading edge of the annular projection and the contact face of the annular connection part.

According to the invention of the fifth aspect, the sealing member such as rubber enhances tight seal around the joint between the base and the upper casing.

In the invention according to a sixth aspect, the air cleaner case is such that the area of the smallest cross section of the inlet passage is made almost identical to that of the exhaust duct.

According to the invention of the sixth aspect, decreasing the area of the smallest cross section of the inlet passage so as to substantially equal that of the exhaust duct reduces air current noise generated in the inlet duct.

The present invention has the advantages described below. The long straight inlet passage reduces air current noise generated from the air cleaner case, and hence also reduces noise generated from the entire engine. In addition, the inlet duct draws in unheated outside air from its lower end located apart from the cylinder section in a lateral direction. This prevents fuel carburetion in the carburetor from being affected by heated air.

DETAILED DESCRIPTION OF THE PREFERRED EMBODIMENTS

Referring to the accompanying drawings, there will be described preferred embodiments of an air cleaner of the invention.

Figure 1:
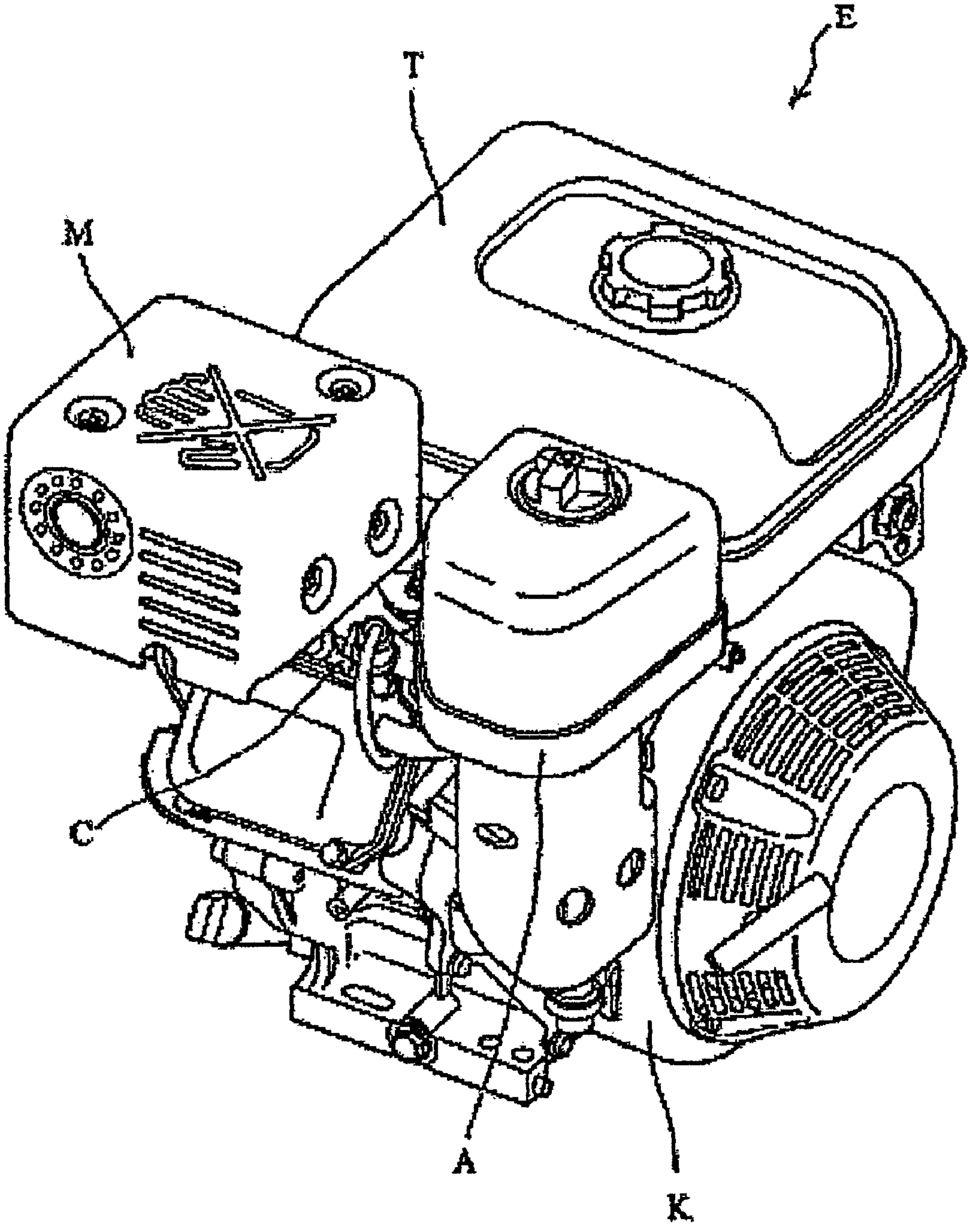
FIG. 1 is a perspective view showing the appearance of an inclined type general-purpose engine equipped with an air cleaner according to the invention.
Figure 2:
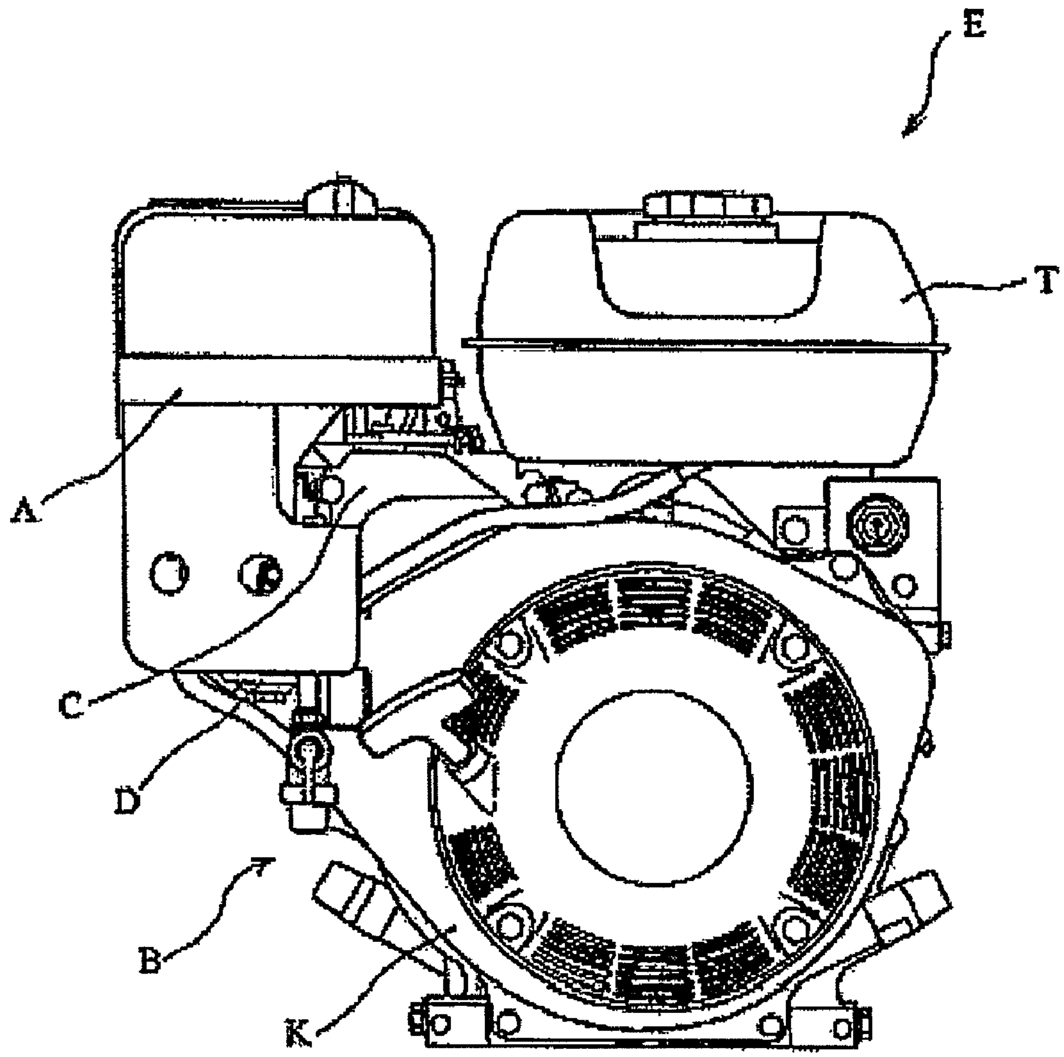
FIG. 2 is a front view of the engine shown in FIG. 1.
Figure 3:
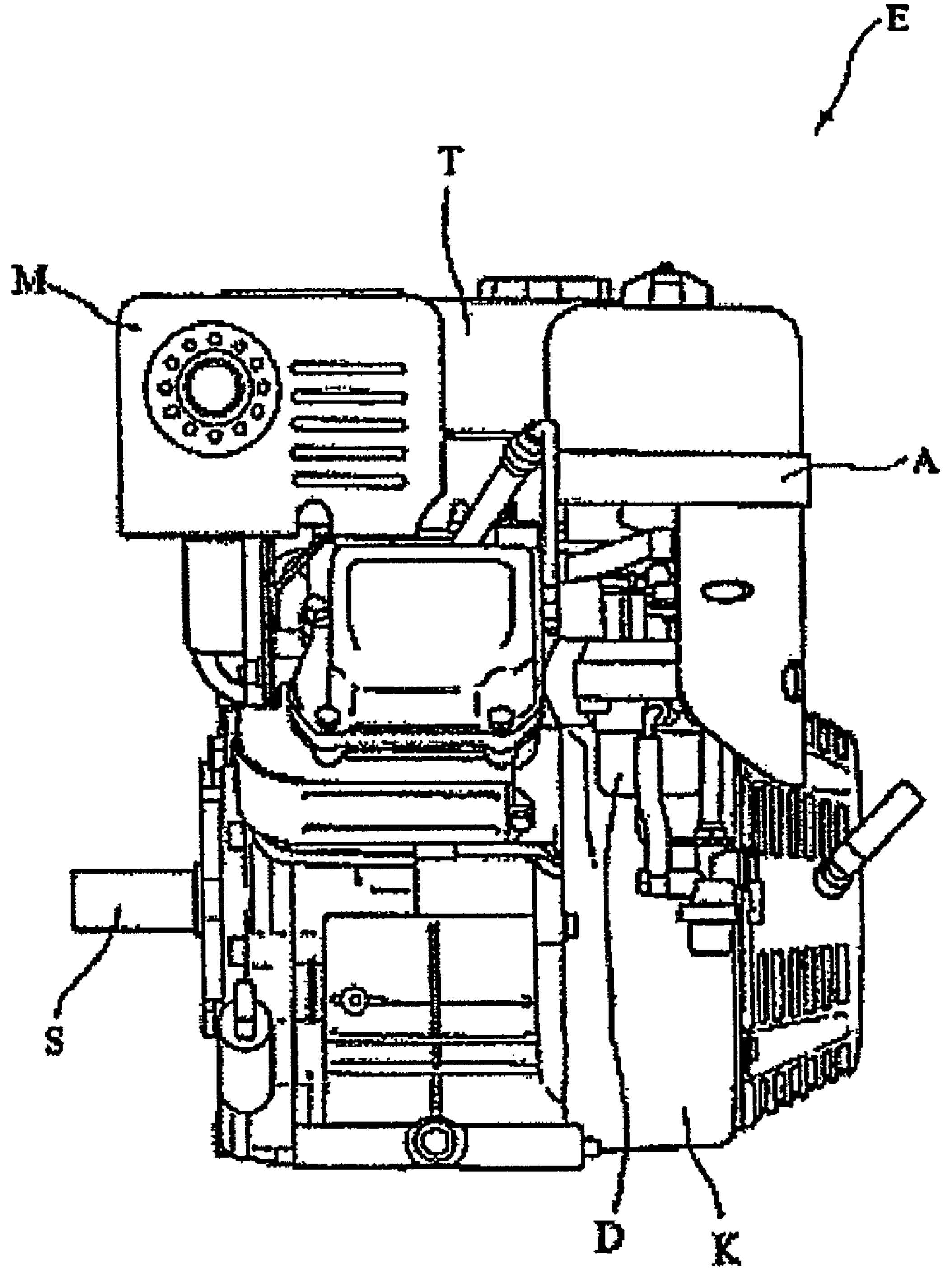
FIG. 3 is a left side view of the engine shown in FIG. 2.
Figure 4:
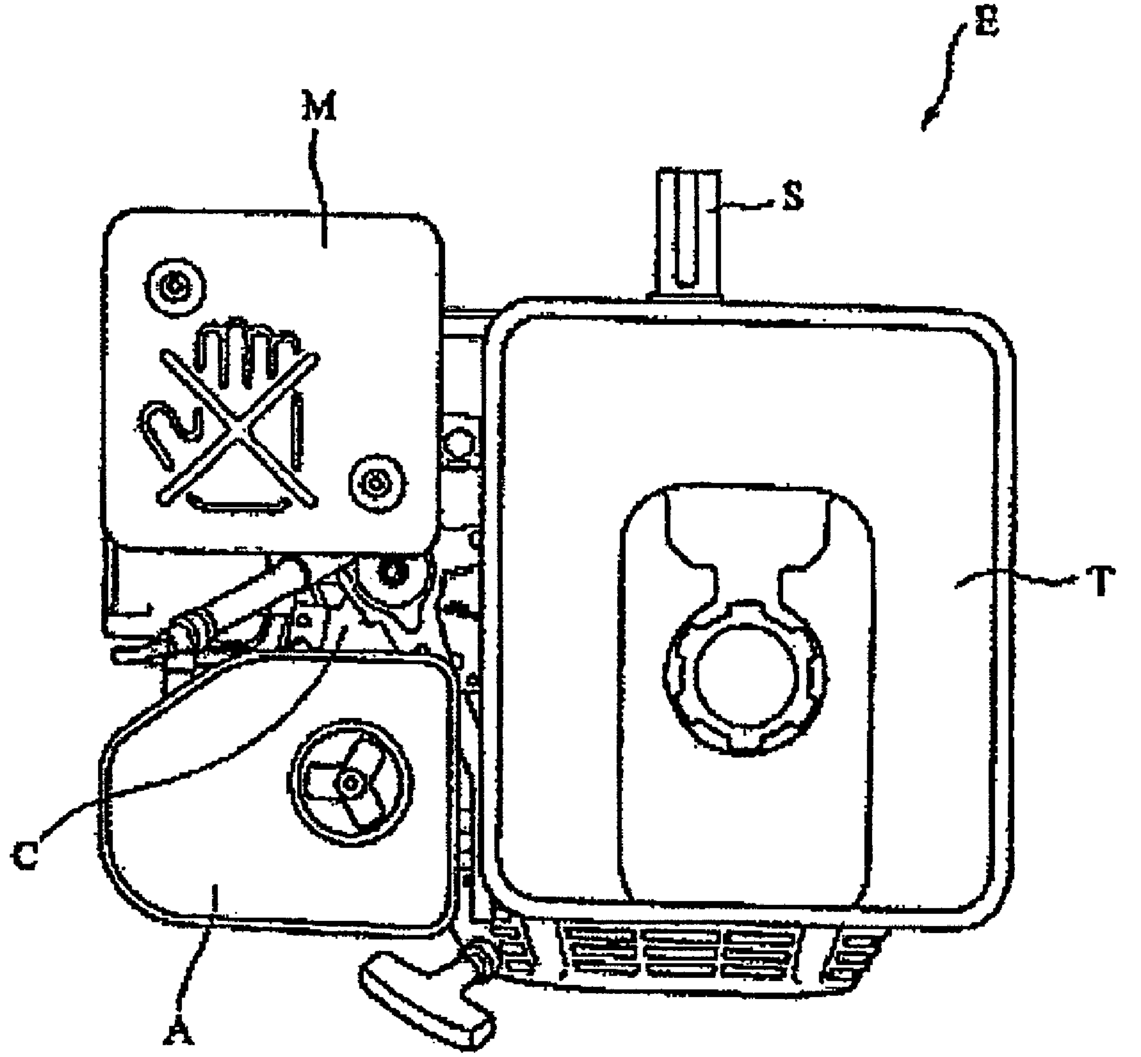
FIG. 4 is a plan view of the engine shown in FIG. 2.

FIG. 1 is a perspective view showing the appearance of an inclined type single cylinder general-purpose engine equipped with an air cleaner according to the invention. FIG. 2 is a front view of the engine. FIG. 3 is a left side view of the engine. FIG. 4 is a plan view of the engine. In these drawings, reference letter E represents the engine; B, an engine body including a cylinder section C and a crank case K; T, a fuel tank; M, an exhaust muffler; A, an air cleaner.

Figure 5:
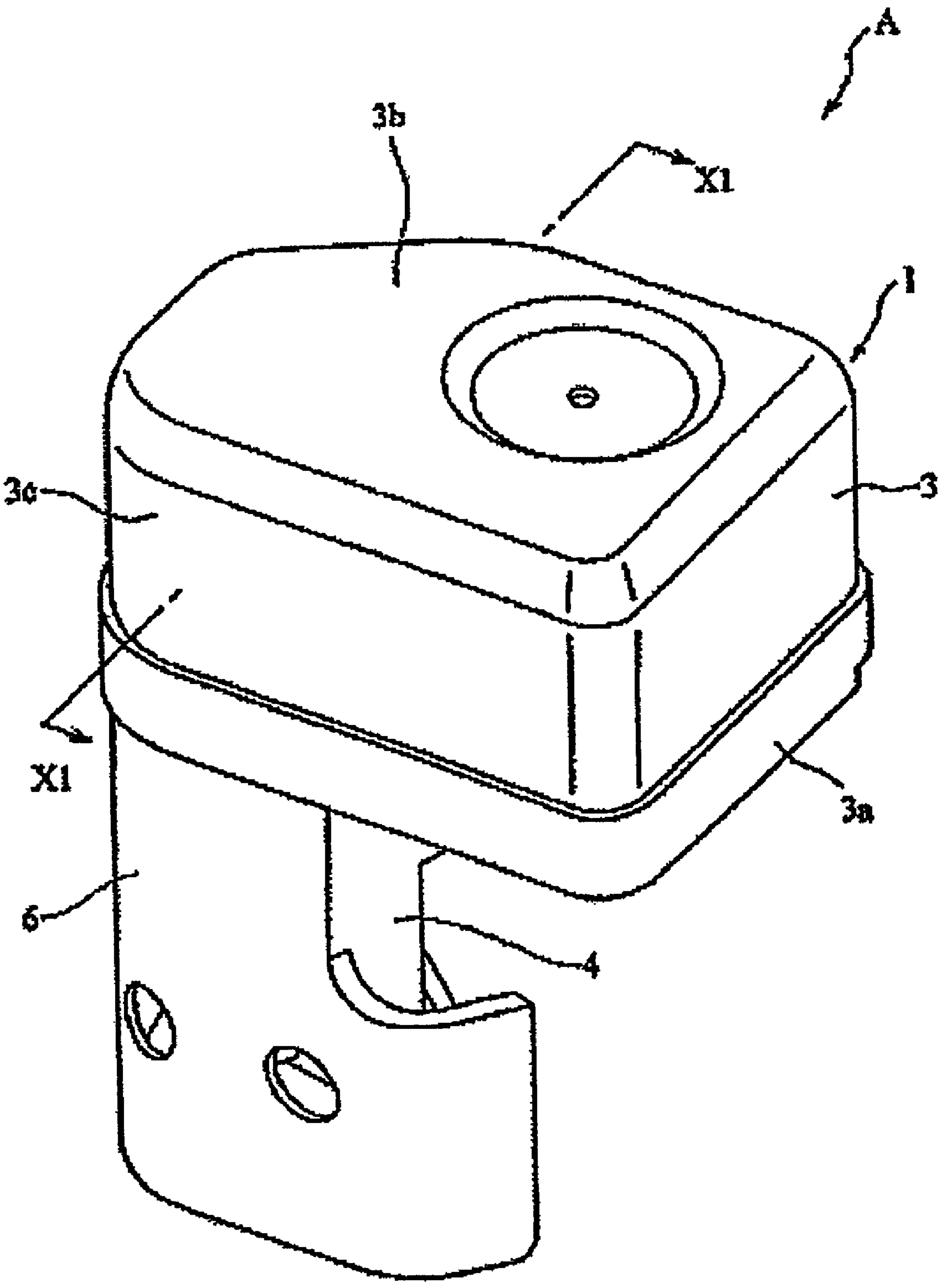
FIG. 5 is a perspective view showing the appearance of the air cleaner.
Figure 6:
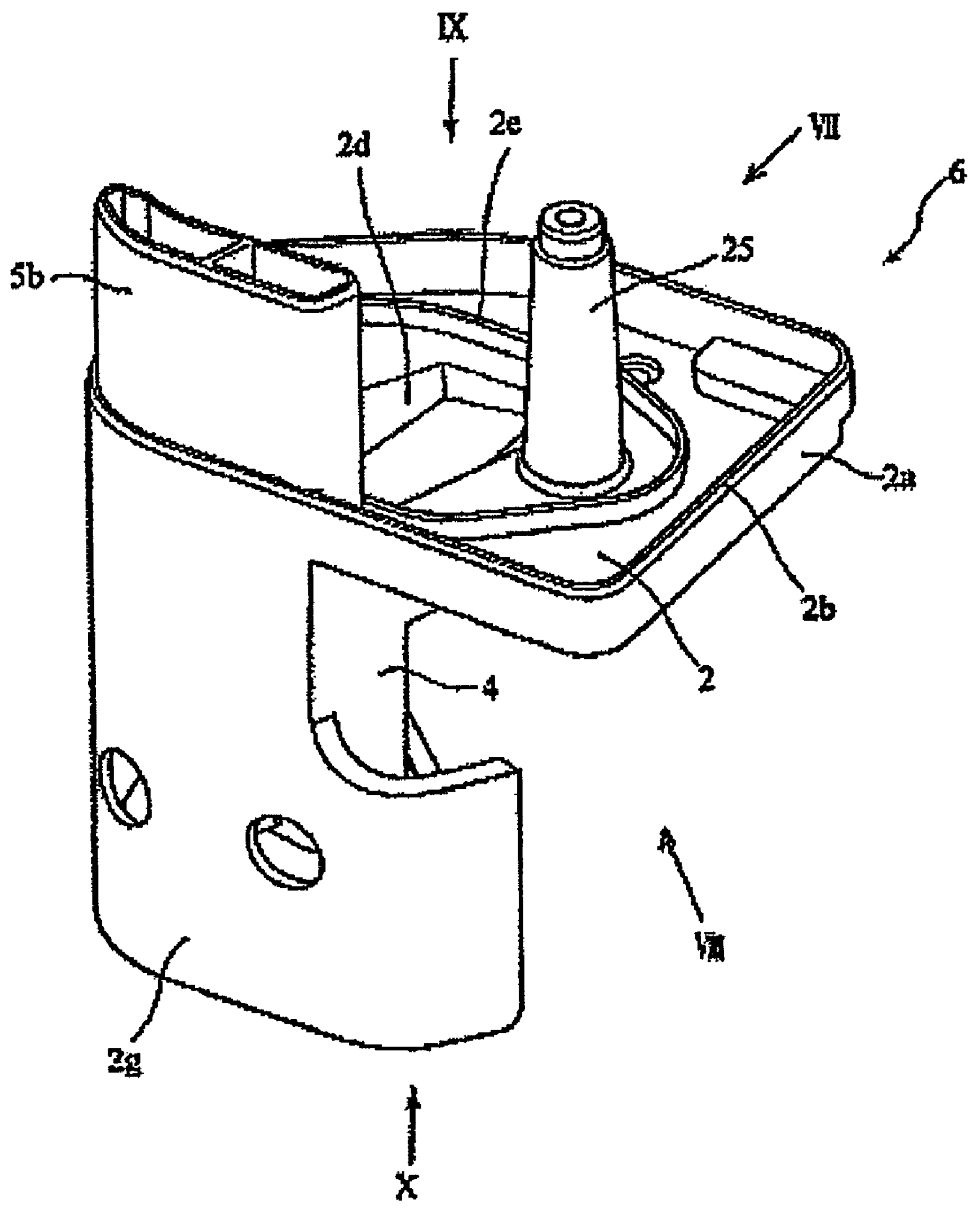
FIG. 6 is a perspective view showing the components of an air cleaner case after the cover has been removed from the air cleaner shown in FIG. 5.
Figure 7:
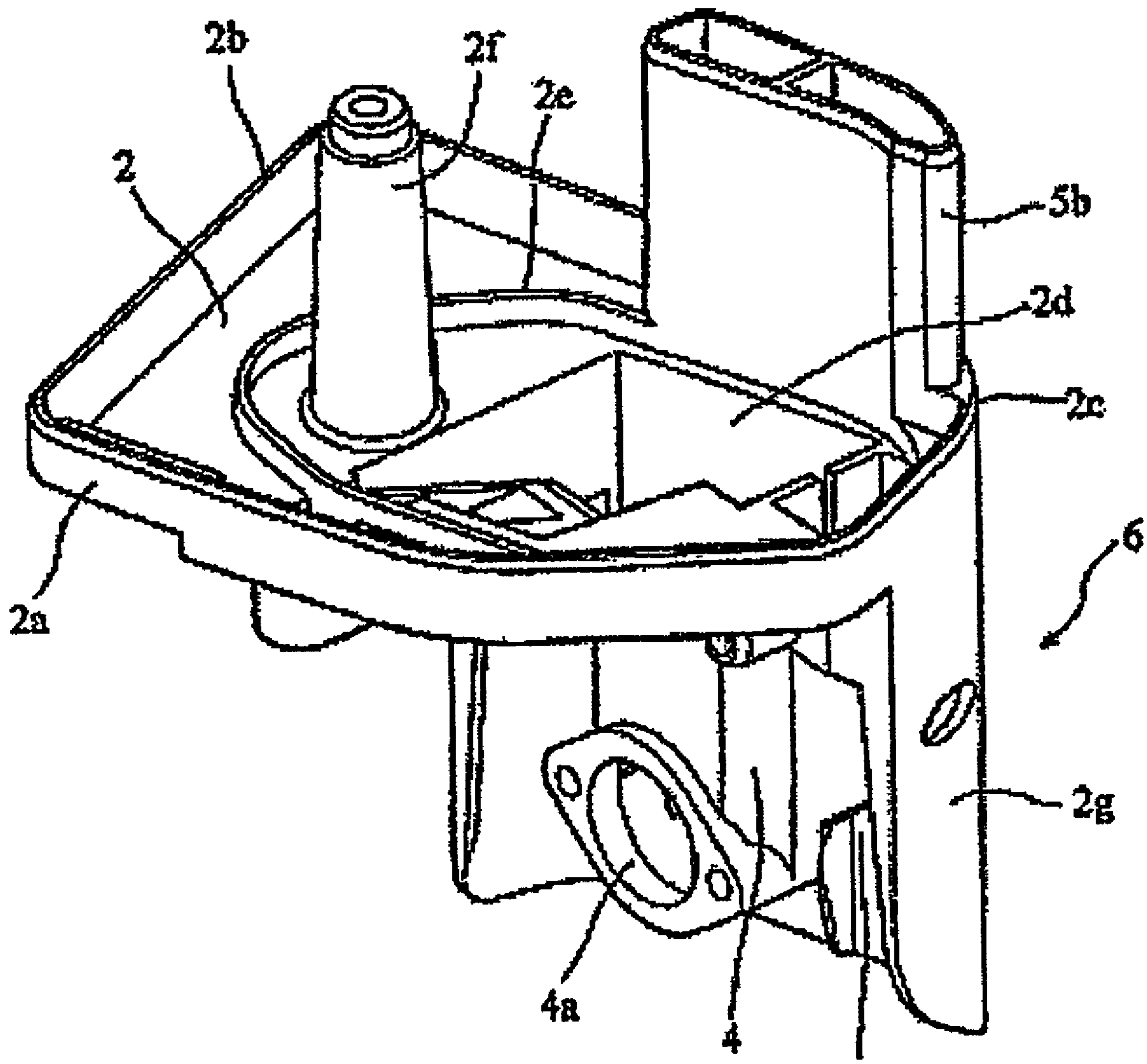
FIG. 7 is a perspective view of the components of the air cleaner as viewed from the direction of arrow VII shown in FIG. 6.
Figure 8:
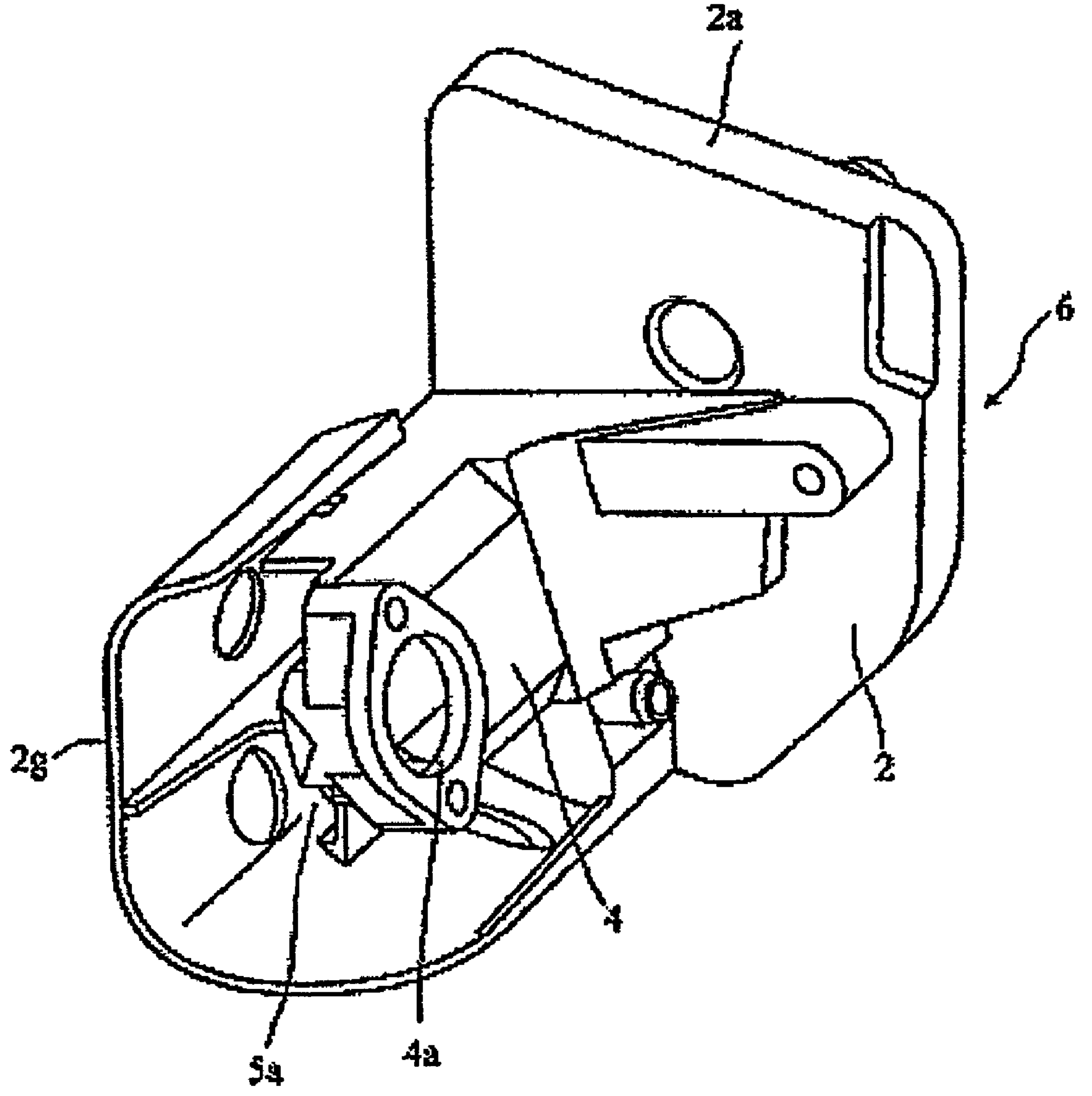
FIG. 8 is a perspective view of the components of the air cleaner as viewed from the direction of arrow VIII shown in FIG. 6.
Figure 9:
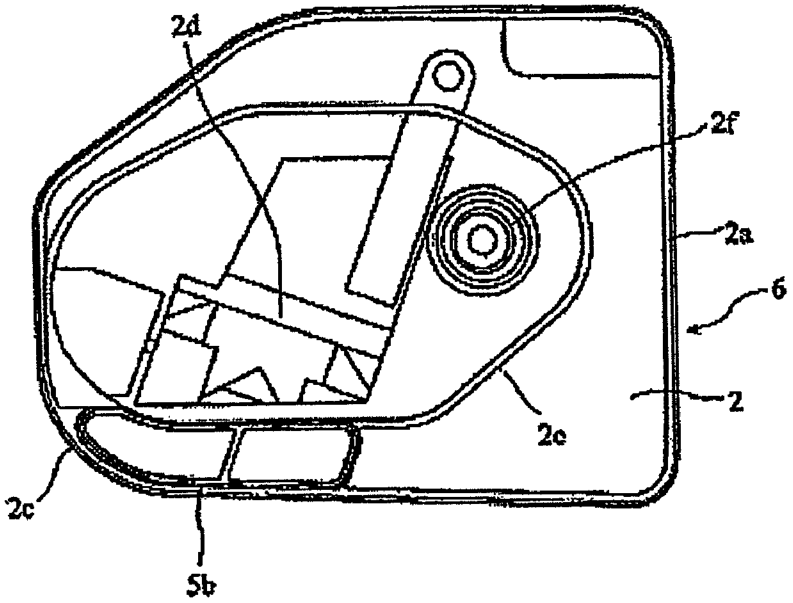
FIG. 9 is a plan view of the components of the air cleaner case as viewed from the arrow IX shown in FIG. 6.
Figure 10:
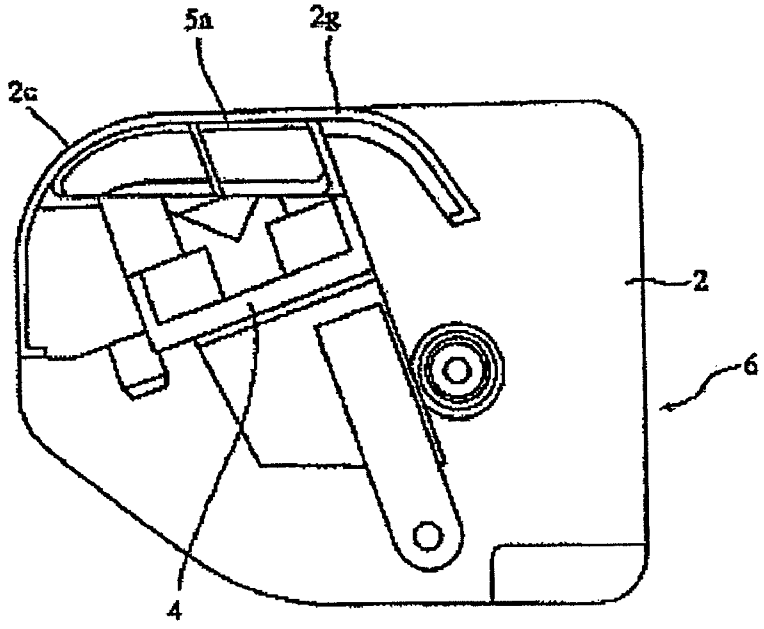
FIG. 10 is a bottom view of the components of the air cleaner case as viewed from the arrow X shown in FIG. 6.
Figure 11:
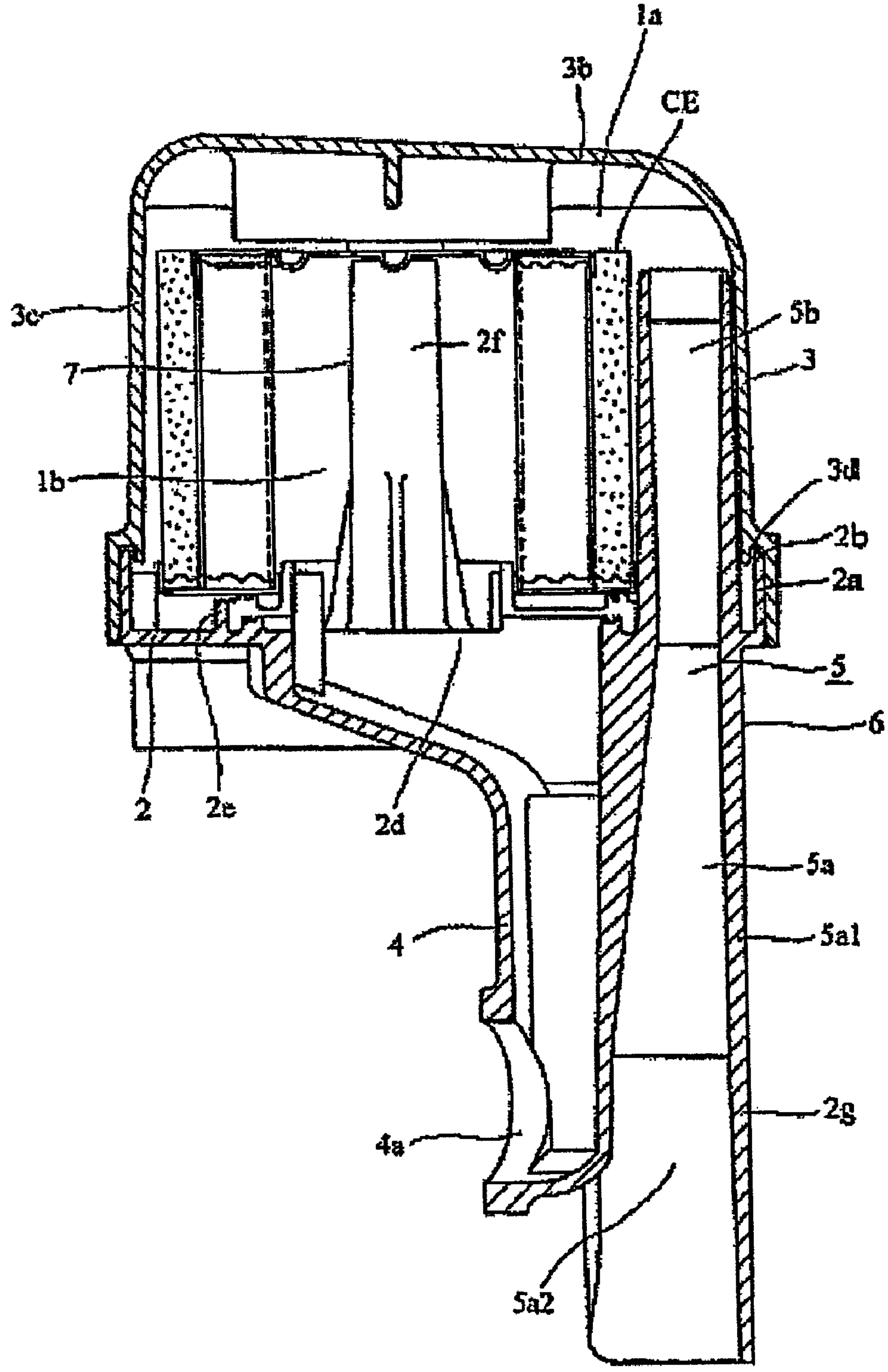
FIG. 11 is a sectional view taken along the line XI-XI shown in FIG. 5.

FIG. 5 is a perspective view showing the appearance of the air cleaner A, FIG. 6 is a perspective view showing the components of an air cleaner case after the cover has been removed from the air cleaner shown in FIG. 5. FIG. 7 is a perspective view of the components of the air cleaner as viewed from the direction of arrow VII shown in FIG. 6. FIG. 8 is a perspective view of the components of the air cleaner as viewed from the direction of arrow VIII shown in FIG. 6. FIG. 9 is a plan view of the components of the air cleaner case as viewed from the arrow IX shown in FIG. 6. FIG. 10 is a bottom view of the components of the air cleaner case as viewed from the arrow X shown in FIG. 6. FIG. 11 is a sectional view taken along the line XI-XI shown in FIG. 5.

An inclined type general-purpose engine as shown in FIGS. 1 to 4 has the crank case K including a freely rotatable crank shaft S (see FIG. 3). The cylinder section C is mounted on the crank case K and inclined upward from the crank case K. The fuel tank T is mounted on the engine body B so as to be located above the crank case K. The exhaust muffler M and the air cleaner A are mounted on the engine body B so as to be disposed on corresponding sides of the cylinder section C.

The air cleaner A takes in and purifies outside air, and supplies the purified air to a carburetor D (see FIG. 3) disposed below the air cleaner A.

As shown in FIGS. 5 to 11, the air cleaner A includes a cleaner element CE (FIG. 11) that filters outside air taken in the air clear A; a lower casing 6 holding the cleaner element CE thereon; and a cover (i.e., upper casing) 3 connected to the lower casing 6 so as to accommodate this cleaner element CE. The lower casing 6 and cover 3 compose the air cleaner case 1. The inside of the air cleaner case 1 is sectioned into a dirty side 1_a_ and a clean side 1_b_ by the cleaner element CE.

The lower casing 6 has: a base 2 on which the cleaner element CE is placed; an exhaust duct 4 one end of which communicates with the clean side 1_b_ such that air purified by the cleaner element CE is guided to the carburetor D, that is, the intake side of the engine; an inlet duct 5_a_ that takes in outside air; and an intake cylinder 5_b_ one end of which communicates with the inlet duct 5_a_, and the other end of which communicates with the dirty side 1_a_. The base 2, exhaust duct 4, inlet duct 5_a_, and intake cylinder 5_b_ are integrally formed of a resin.

As shown in FIGS. 9 and 10, the base 2 is in the form of aboard of approximately rectangular shape, from which, as viewed from above, a corner has been removed. Defined in the base 2 is an opening 2_d_ communicating with the exhaust duct 4. The opening 2_d_ lies in the direction of a corner 2_c_ and is located in an off-center area of the base 2. The corner 2_c_ corresponds to the corner of the base 2, which corner is located away from the cylinder section C when the air cleaner A is mounted on the engine body B, as shown in FIGS. 1 to 4.

Formed on the upper face of the base 2 is a rib 2_e_ surrounding the opening 2_d_. Formed on the upper face of the base 2 is also an upward extending cylindrical projection 2_f_ for screwing the cover 3 to the base 2. As shown in FIG. 11, the cleaner element CE is placed on the rib 2_e_ of the base 2 with the cylindrical projection 2_f_ inserted vertically into an engagement hole 7 in the center of the cleaner element CE. Formed vertically on the periphery of the upper face of the base 2 is also an annular projection 2_a_. As described below, this annular projection 2*a* engages with an annular connection part 3*a* formed on the periphery of the box-shaped cover 3 open at the bottom.

The exhaust duct 4 is formed integrally with the base 2 so as to extend downward from the underside of the base 2. Formed in the lower end of the exhaust duct 4 is an exhaust port 4*a* through which air from the clean side 1*b*, purified by the air cleaner element CE, is conveyed to the carburetor D.

On the opposite side to the carburetor D of the exhaust duct 4 is an inlet duct 5*a* formed integrally with the base 2 so as to extend downward at least almost the same length as the exhaust duct 4 from the base 2 along the exhaust duct 4. The wall 5*a*1 of the inlet duct 5*a*, which wall 5*a*1 is opposite to the exhaust duct 4, is formed using a part of a wall 2*g* composed to cover the exhaust duct 4 and inlet duct 5*a*. The inlet duct 5*a* is located apart from the carburetor D and can, therefore, be extended downward along the exhaust duct 4 and wall 2*g* without being blocked by the carburetor D. In addition, since an outside air intake port 5*a*2 in the lower end of the inlet duct 5*a* is situated laterally away from the cylinder section C, air heated in the cylinder section C is prevented from being drawn into the air cleaner A.

Integrally formed on the base 2 is the inlet cylinder 5*b* extending upward from the upper face of the base 2 so as to be continuous with the duct 5*a*. The upper end of the inlet cylinder 5*b* extends to the vicinity of the top wall 3*b* of the cover 3 attached to the base 2. The inlet cylinder 5*b* forms a substantially straight long inlet passage 5 together with the inlet duct 5*a*.

As shown in FIGS. 5 and 11, the cover 3 has a top wall 3*b* and a peripheral wall 3*c*. Formed on the underside of the peripheral wall 3*c* is an annular connection part 3*a*. Formed in the annular connection part 3*a* is an annular groove 3*d* in which the leading edge 2*d* of the annular projection 2*a* of the base 2 fits. Formed along the outer edge of the annular groove 3*d* is an annular wall 3*e* covering the outer circumference of the annular projection 2*a*.

When the cover 3 is mounted on the base 2 of the lower casing 6, the annular connection part 3*a* of the cover 3 engages with the annular projection 2*a* of the base 2. At this time, the upper edge 2*b* of the annular projection 2*a* fits into the annular groove 3*d* of the cover 3 and comes into contact with the bottom (i.e., contact face) of the annular groove 3*d*. In addition, the annular wall 3*e* of the cover 3 covers the length of the outer circumference of the annular projection 2*a*. When the cover 3 is pressed and fixed to the base 2 by a mounting screw engaged with the threaded cylindrical projection 2*f*, which is projecting upward through the cleaner element CE, the upper edge 2*b* of the annular projection 2*a* is pressed against the contact face of the annular groove 3*d* with the required pressing force. This forms a tight seal around the joint between the base 2 and the cover 3. Inserting a sealing member such as rubber between the contact faces of the upper edge 2*b* and annular groove 3*d* increases the degree of tightness. Such a securely tight seal prevents penetration of outside air through the joint between the base 2 and cover 3, and hence also prevents emission of air current noise.

When the engine body A is in operation, outside air is drawn from the outside air intake port 5*a*2, flows through the inlet passage 5, which is long and almost straight, and then flows into the dirty side 1*a* defined in the air cleaner case 1. The outside air that has flowed into the dirty side 1*a* is purified when passing through the cleaner element CE and enters the clean side 1*b*. The purified air flows through the opening 2*d*, then flows into the exhaust duct 4, and is emitted from the exhaust port 4*a* to the carburetor D, i.e., to the intake port of the engine. The long, straight inlet passage 5, which has the downward extending inlet duct 5*a*, works so well to reduce air current noise when the air flows therein.

The area of the smallest cross section of the inlet passage 5, which comprises the inlet duct 5*a* and inlet cylinder 5*b*, is made almost identical to that of the exhaust duct 4, thereby enhancing the effect in reducing air current noise.

Additionally, since the intake duct 5*a* is disposed apart from the cylinder section C of the lower casing 6, the inlet passage 5 can take in from the outside air intake port 5*a*2 outside air that is not heated by heat from the engine body B. This prevents fuel carburetion in the carburetor D from being affected by heated air.

Further, since the base 2, exhaust duct 4, inlet duct 5*a*, and inlet cylinder 5*b* are integrally formed from a resin, an air cleaner case that reduces air current noise can be easily manufactured by ejection molding. Additionally, since integral molding increases the rigidity of the air cleaner case, resonance with engine vibration may be reduced, thereby achieving the effect in reducing noise.

The inlet duct 5*a* is disposed along the exhaust duct 4. Accordingly, the outer shape of the air cleaner case 1 may be almost identical to that of a conventional air cleaner case. This makes it possible to easily replace the existing air cleaner for the same type of engine with an air cleaner having an air cleaner case of the present invention so as to reduce air current noise.

It is understood that the present invention is not limited to the foregoing embodiment and that various changes and modifications may be made in the invention without departing from the spirit and scope thereof. For example, albeit the inclined type general-purpose engine shown in the drawings utilizes a single cylinder, the present invention can also be applied in an engine utilizing a plurality of cylinders.

What is claimed is:

1. An air cleaner comprising:

an air cleaner case, and;

a cleaner element accommodated in the air cleaner case and being used for sectioning the inside of the air cleaner into a dirty side and a clean side so that outside air that has flowed into the dirty side is purified by the cleaner element and the purified air is caused to flow into the clean side, wherein the air cleaner case includes a lower casing holding the cleaner element thereon and an upper casing mounted on the lower casing and accommodates the cleaner element therein, wherein the lower casing includes a base on which the cleaner element is mounted, an exhaust duct extending downward from the base such that one end thereof communicates with the clean side and the other end thereof is communicable with the intake side of the engine, an inlet duct extending downward from the base along the exhaust duct such that the lower end thereof communicates with the outside, and an inlet cylinder extending upward from the base such that the upper end thereof communicates with the dirty side and the lower end thereof communicates with the upper end of the inlet duct.

2. An air cleaner according to claim 1, wherein the inlet duct is disposed on the opposite side to an engine intake side of the exhaust duct and extends downward at least almost the same length as the exhaust duct, and an inlet passage which forms from the inlet duct and the inlet cylinder is almost straight.

3. An air cleaner according to claim 1, wherein the base, the exhaust duct, and the inlet duct are integrally formed from a resin.

4. An air cleaner according to claim 1, wherein the base is in the form of a board and has an upward annular projection formed on the periphery of the base, and the upper casing is in the form of a box open at one end and has an annular connection part formed on the periphery of the open end so as to engage with the annular projection, wherein the annular connection part has a contact face with which the leading edge of the annular projection comes into contact when the annular connection part fits on the annular projection.

5. An air cleaner according to claim 4, wherein a sealing member is inserted between the leading edge of the annular projection and the contact face of the annular connection part.

6. An air cleaner according to claim 1, wherein the area of the smallest cross section of the inlet passage is made almost identical to that of the exhaust duct.

7. An air cleaner according to claim 1, wherein said inlet duct has an air intake port which is at least almost commensurate or positioned below said other end of the exhaust duct.

8. An air cleaner according to claim 7, wherein said intake port extends down to or below the lower end of said exhaust duct.

9. An air cleaner according to claim 1, wherein said inlet duct and said exhaust port share a common downwardly projection wall.

10. An air cleaner according to claim 9, wherein said common wall is an interior wall of said inlet duct.

11. An air cleaner according to claim 1, wherein each of said inlet duct and said inlet cylinder have an annular wall configuration extending, respectively, above and below said base, as to define a continuous, elongated air passageway.

12. An air cleaner according to claim 1, wherein said inlet duct extends at least the same length downward from said base or lower than said exhaust duct.

13. An air cleaner comprising:

an air cleaner case, and;

a cleaner element accommodated in the air cleaner case and being used for sectioning the inside of the air cleaner into a dirty side and a clean side so that outside air that has flowed into the dirty side is purified by the cleaner element and the purified air is caused to flow into the clean side, wherein the air cleaner case includes a lower casing holding the cleaner element thereon and an upper casing mounted on the lower casing and accommodating the cleaner element therein, wherein the lower casing includes a base on which the cleaner element is mounted, an exhaust duct extending downward from the base such that one end thereof communicates with the clean side and the other end thereof is communicable with the intake side of the engine, an inlet duct extending downward from the base along the exhaust duct such that the lower end thereof communicates with the outside, and an inlet tube projecting upward from the base such that the upper end thereof communicates with the dirty side and the lower end thereof communicates with the upper end of the inlet duct, and wherein said inlet duct extends down from the base as to form an air passageway with a lower end of said inlet duct defining an intake port for the air passageway.

14. An air cleaner according to claim 13, wherein said intake port is positioned at least almost commensurate or positioned below said other end of the exhaust duct.

15. An air cleaner according to claim 13, wherein said intake port extends below the lower end of said exhaust duct.

16. An air cleaner according to claim 13, wherein said inlet port and said exhaust port share a common downwardly projecting wall.

17. An air cleaner according to claim 16, wherein said common downwardly projecting wall is an interior wall of said inlet duct.

18. An air cleaner according to claim 13, wherein each of said inlet duct and said inlet tube have an annular wall configuration extending, respectively, above and below said base, as to define a continuous, elongated air passageway.

19. An air cleaner according to claim 13, wherein said inlet duct extends at least the same length downward from said base or lower than said exhaust duct.

20. An air cleaner according to claim 13 wherein said inlet duct has an annular configuration with a lower edge positioned below a lower most edge of said upper casing.

* * * * *